United States Patent
Nakagawa et al.

(10) Patent No.: US 10,480,422 B2
(45) Date of Patent: Nov. 19, 2019

(54) CONTROL DEVICE AND CONTROL METHOD FOR A FUEL GAS SUPPLY SYSTEM

(71) Applicants: MITSUBISHI HEAVY INDUSTRIES, LTD., Tokyo (JP); MITSUBISHI HEAVY INDUSTRIES COMPRESSOR CORPORATION, Tokyo (JP)

(72) Inventors: Yosuke Nakagawa, Tokyo (JP); Naoto Yonemura, Hiroshima (JP); Kazuhiro Jahami, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 585 days.

(21) Appl. No.: 15/114,569

(22) PCT Filed: Jul. 31, 2014

(86) PCT No.: PCT/JP2014/070178
§ 371 (c)(1),
(2) Date: Jul. 27, 2016

(87) PCT Pub. No.: WO2016/016988
PCT Pub. Date: Feb. 4, 2016

(65) Prior Publication Data
US 2016/0341131 A1    Nov. 24, 2016

(51) Int. Cl.
*F02C 9/46* (2006.01)
*F02C 7/22* (2006.01)
(Continued)

(52) U.S. Cl.
CPC ............. *F02C 9/46* (2013.01); *F02C 3/22* (2013.01); *F02C 7/22* (2013.01); *F04D 27/0207* (2013.01);
(Continued)

(58) Field of Classification Search
CPC ...... F02C 7/22; F02C 9/46; F02C 3/22; F04D 27/02; F04D 27/0207; F04D 27/02215;
(Continued)

(56) References Cited

U.S. PATENT DOCUMENTS 2,970,435 A * 2/1961 Winters ................. F04D 27/02
60/39.281
5,195,875 A * 3/1993 Gaston ................ F04D 27/0207
415/27
(Continued)

FOREIGN PATENT DOCUMENTS

| JP | 2004-100612 A | 4/2004 |
|----|---------------|--------|
| JP | 2005-76461 A  | 3/2005 |
| JP | 4191563 B2    | 4/2008 |

OTHER PUBLICATIONS

International Search Report dated Oct. 7, 2014 in PCT Application No. PCT/JP2014/070178 with an English Translation.
(Continued)

*Primary Examiner* — Alain Chau
(74) *Attorney, Agent, or Firm* — Birch, Stewart, Kolasch & Birch, LLP

(57) ABSTRACT

A control device (101) that controls a fuel gas supply system (100) that comprises: a compressor (1) that supplies compressed fuel gas to a load apparatus (15); an inflow amount regulating means (5) that regulates the amount of fuel gas that flows into the compressor (1); and an anti-surge valve (7) that is for returning to an inlet side of the compressor (1) fuel gas that is discharged from the compressor (1). The
(Continued)

control device (101) comprises: a main pressure-control unit (101*a*) that controls the inflow amount regulating means (5) and the anti-surge valve (7) on the basis of a feedforward control value that is generated on the basis of the load of the load apparatus (15) and of a prescribed conversion process, and on the basis of a feedback control value that is generated on the basis of the deviation between a set value and a measured value for the discharge pressure of the compressor (1); and an emergency pressure-control unit (101*b*) that calculates a bias-added control value that is found by adding a predetermined bias value to an anti-surge valve control value that is for controlling the anti-surge valve (7) and that is calculated on the basis of at least one of the feedforward control value and the feedback control value, and that, on the basis of the occurrence of load variations that are at or above a prescribed value, switches between the anti-surge control value and the bias-added control value and controls the anti-surge valve (7).

12 Claims, 6 Drawing Sheets

(51) Int. Cl.
*F04D 27/02* (2006.01)
*F02C 3/22* (2006.01)
(52) U.S. Cl.
CPC ..... *F04D 27/0223* (2013.01); *F04D 27/0246* (2013.01); *F05D 2220/32* (2013.01); *F05D 2270/091* (2013.01); *F05D 2270/101* (2013.01); *F05D 2270/3013* (2013.01)

(58) Field of Classification Search
CPC ............. F04D 27/0223; F04D 27/0246; F04D 27/0215; F05D 2220/32; F05D 2270/101; F05D 2270/3013; F05D 2270/091
See application file for complete search history.

(56) References Cited

U.S. PATENT DOCUMENTS

| | | | | |
|---|---|---|---|---|
| 5,609,016 | A * | 3/1997 | Yamada | F02C 3/22 |
| | | | | 60/39.281 |
| 5,798,941 | A * | 8/1998 | McLeister | G05B 11/42 |
| | | | | 415/1 |
| 6,907,722 | B2 * | 6/2005 | Tanaka | F02C 9/20 |
| | | | | 415/27 |
| 7,472,541 | B2 * | 1/2009 | Takeda | F04D 27/02 |
| | | | | 415/17 |
| 7,556,473 | B2 * | 7/2009 | Takeshita | F02C 7/236 |
| | | | | 415/151 |
| 2004/0045275 | A1 * | 3/2004 | Tanaka | F02C 9/20 |
| | | | | 60/39.281 |
| 2006/0101824 | A1 * | 5/2006 | Takeda | F04D 27/02 |
| | | | | 60/727 |
| 2007/0110587 | A1 * | 5/2007 | Takeshita | F02C 7/236 |
| | | | | 417/26 |

OTHER PUBLICATIONS

Written Opinion dated Oct. 7, 2014 in PCT Application No. PCT/JP2014/070178 with an English Translation.

* cited by examiner

CONTROL DEVICE AND CONTROL METHOD FOR A FUEL GAS SUPPLY SYSTEM

TECHNICAL FIELD

The present invention relates a control device and a control method of a compressor which compresses fuel gas.

BACKGROUND ART

A fuel gas supply system has been suggested, which includes control means for adjusting an amount of fuel gas supplied to a load apparatus such as a gas turbine so as to maintain a discharge pressure of a compressor which compresses the fuel gas within a set range.

However, in the fuel gas supply system of the related art, in some cases, it is not possible to appropriately cope with rapid variation of consumption in the fuel gas which is generated during interruption of a load, during tripping of a gas turbine, or the like. Accordingly, a technology has been suggested, which maintains a discharge pressure of a compressor at a set value by controlling an opening degree of an inlet guide vane (IGV) provided in the compressor, and returns a portion of the fuel gas discharged from the compressor to an inlet side of the compressor by rapidly opening an anti-surge valve (ASV) (also referred to as a recycle control valve (RCV)) which is connected to an outlet of the compressor during interruption of the compressor or the like so as to avoid so-called surging.

In addition, a fuel gas supply system has been suggested, which further improves the above-described fuel gas supply system, and can obtain improved control results not only during normal operation but also during interruption of the load, tripping of the compressor and the gas turbine, or the like, by using not only the inlet guide vane but also the anti-surge valve so as to control the discharge pressure of the compressor (for example, refer to PTL 1).

CITATION LIST

[PTL 1] Japanese Unexamined Patent Application Publication No. 2005-076461

SUMMARY OF INVENTION

Technical Problem

Compared to the fuel gas supply system of the related art, according to the fuel gas supply system disclosed in PTL 1, response characteristics with respect to interruption of a load are improved. However, according to the fuel gas supply system disclosed in PTL 1, in a case where rapid load variation such as interruption of a load occurs, overshoot and undershoot by a predetermined amount in the pressure which is a feedback control object may occur, and a little time is required until stability is obtained.

The present invention provides a control device and a control method capable of more immediately stabilizing variation of the pressure in a case where rapid load variation occurs in a load apparatus.

Solution to Problem

According to a first aspect of the present invention, there is provided a control device which controls a fuel gas supply system which includes a compressor which compresses fuel gas and supplies the compressed fuel gas to a load apparatus, inflow amount regulating means for regulating an amount of fuel gas which flows into the compressor, and an anti-surge valve for returning the fuel gas discharged from the compressor to an inlet side of the compressor, in which the control device includes: a main pressure control unit which controls the inflow amount regulating means and the anti-surge valve on the basis of a feedforward control value which is generated on the basis of a load of the load apparatus and a predetermined conversion process, and a feedback control value which is generated on the basis of a deviation between a set value of a discharge pressure of the compressor and a measured value of the discharge pressure of the compressor; and an emergency pressure control unit which calculates a bias-added control value by adding a predefined bias value to an anti-surge valve control value which is calculated on the basis of at least one of the feedforward control value and the feedback control value and controls the anti-surge valve, and switches the anti-surge valve control value to the bias-added control value on the basis of occurrence of load variation of a predetermined value or more to control the anti-surge valve.

According to a second aspect of the present invention, in the above-described control device, the emergency pressure control unit returns the bias-added control value to the anti-surge valve control value after a predetermined time which is defined in advance elapses from when the load variation occurs to control the anti-surge valve.

According to a third aspect of the present invention, in the above-described control device, after the emergency pressure control unit maintains an output of the bias value from when the load variation occurs for a certain time, the emergency pressure control unit decreases the output of the bias value to zero at a constant rate for a certain time.

According to a fourth aspect of the present invention, in the above-described control device, the emergency pressure control unit calculates a plurality of bias-added control values by adding the bias value to each of the anti-surge valve control values corresponding to a plurality of compressors during operation, and controls the anti-surge valve corresponding to each of the plurality of compressors on the basis of each of the bias-added control values.

According to a fifth aspect of the present invention, in the above-described control device, the emergency pressure control unit returns the bias-added control value to the anti-surge valve control value and simultaneously adds the bias value to the feedback control value, and the main pressure control unit controls the inflow amount regulating means and the anti-surge valve on the basis of the feedforward control value and the feedback control value to which the bias value is added.

According to a sixth aspect of the present invention, there is provided a control method which controls a fuel gas supply system which includes a compressor which compresses fuel gas and supplies the compressed fuel gas to a load apparatus, inflow amount regulating means for regulating an amount of fuel gas which flows into the compressor, and an anti-surge valve for returning the fuel gas discharged from the compressor to an inlet side of the compressor, in which the control method includes: a step of a main pressure control unit controlling the inflow amount regulating means and the anti-surge valve on the basis of a feedforward control value which is generated on the basis of a load of the load apparatus and a predetermined conversion process, and a feedback control value which is generated on the basis of a deviation between a set value of a discharge pressure of the compressor and a measured value of the discharge pressure of the compressor; and a step of an emergency pressure control unit calculating a bias-added control value by adding a predefined bias value to an anti-surge valve control value which is calculated on the basis of at least one of the feedforward control value and the feedback control value and controls the anti-surge valve, and switching the anti-surge valve control value to the bias-added control value on the basis of occurrence of load variation of a predetermined value or more to control the anti-surge valve.

Advantageous Effects of Invention

According to the above-described control device and control method, it is possible to more immediately stabilize variation in a pressure in a case where rapid load variation occurs in a load apparatus.

DESCRIPTION OF EMBODIMENTS

First Embodiment

Hereinafter, a fuel gas supply system according to a first embodiment is described in detail with reference to FIGS. 1 to 6.

Figure 1:
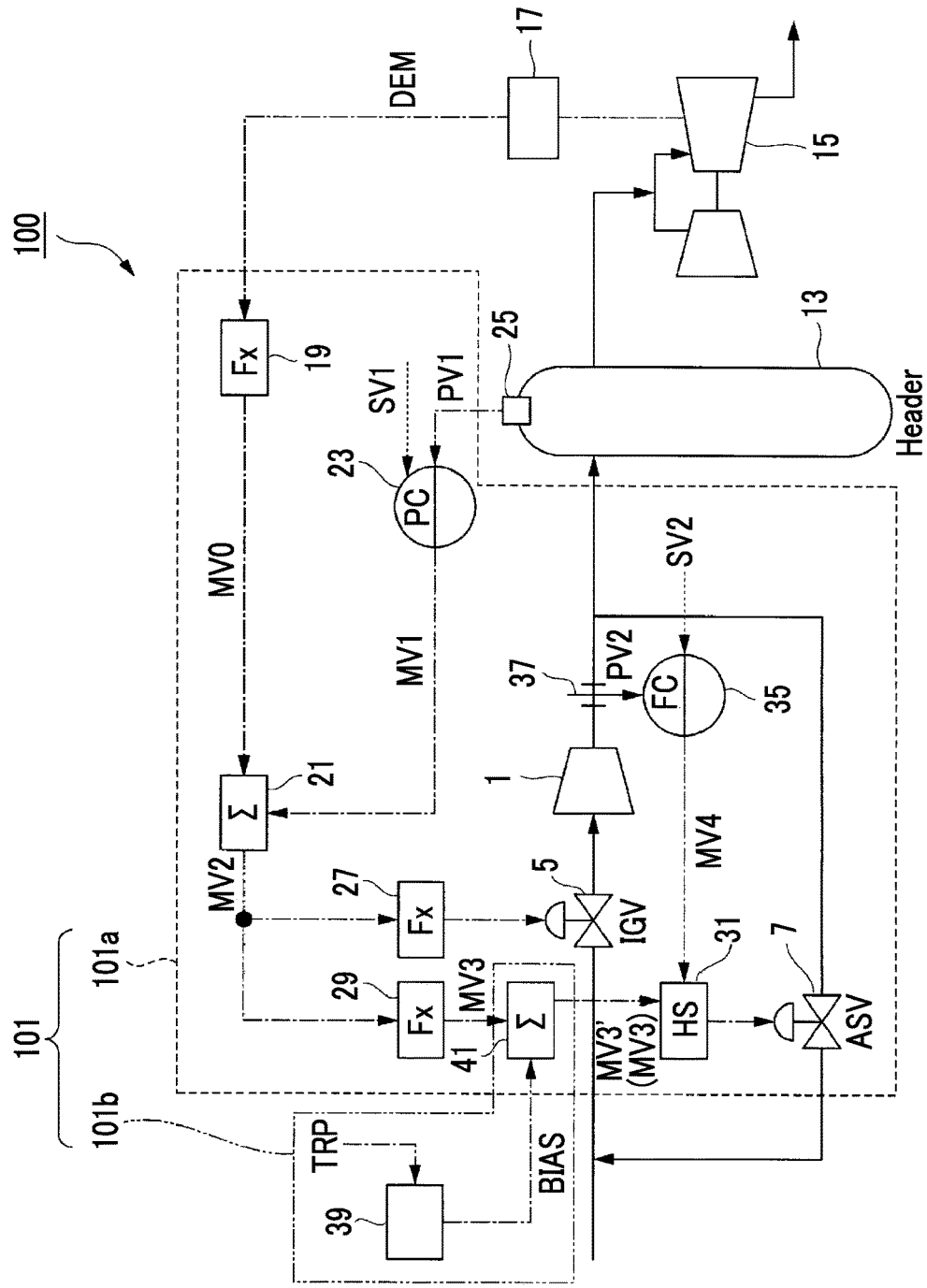
FIG. 1 is a diagram showing a functional configuration of a fuel gas supply system according to a first embodiment.

FIG. 1 is a diagram showing a functional configuration of a fuel gas supply system according to a first embodiment.

As shown in FIG. 1, a fuel gas supply system 100 includes a compressor 1, an inlet guide vane (hereinafter, referred to as IGV 5) which is inflow amount regulating means, an anti-surge valve (hereinafter, referred to as ASV 7), a header tank 13, and a control device 101.

The fuel gas supply system 100 supplies fuel gas to a gas turbine 15 (load apparatus) which is a supply destination of compressed fuel gas. A supply amount of the fuel gas is determined by a demand signal DEM which is output by a load command 17. The demand signal DEM output by the load command 17 defines a target value of a load of the gas turbine 15, a control device 101 described below receives the demand signal DEM, and thus, the fuel gas of an amount corresponding to the target value of the load of the gas turbine 15 is supplied by the fuel gas supply system 100.

The compressor 1 compresses the fuel gas supplied through the IGV 5, and supplies the compressed fuel gas to the gas turbine 15 via the header tank 13.

The IGV 5 is a valve which regulates an amount of the fuel gas which is supplied from the upstream side and flows into the compressor 1. In addition, a pressure control valve (PCV) (not shown) is installed on the upstream side of the IGV 5, and the pressure control valve sequentially supplies the fuel gas such that a pressure is constantly maintained on the upstream side of the IGV 5.

The ASV 7 is a valve which regulates a flow rate of the fuel gas, and returns the compressed fuel gas discharged from the compressor 1 to an inlet side (the upstream side of the IGV 5 in the pipe which connects the PCV and the compressor 1) of the compressor 1.

The control device 101 includes a main pressure control unit 101a and an emergency pressure control unit 101b.

In addition, in the example shown in FIG. 1, an aspect in which a single gas turbine 15 is connected to the header tank 13 is shown. However, the present invention is not limited to this, and a plurality of gas turbines 15 may be connected to the header tank 13.

Figure 2:
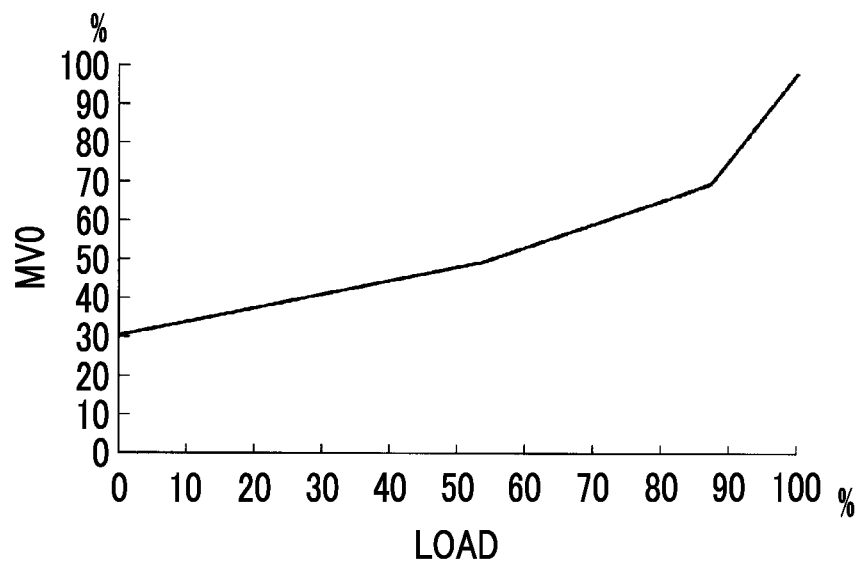
FIG. 2 is a first diagram explaining a function of a main pressure control unit according to the first embodiment.
Figure 3:
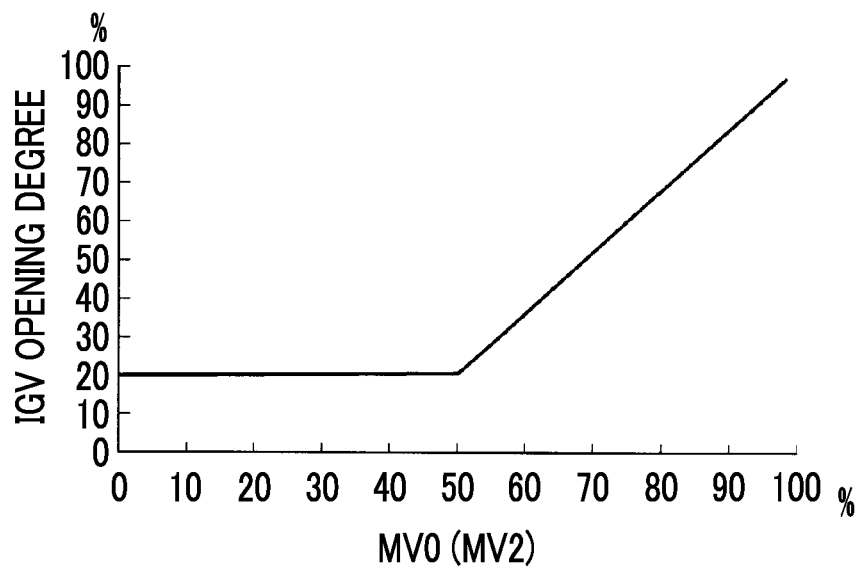
FIG. 3 is a second diagram explaining the function of the main pressure control unit according to the first embodiment.
Figure 4:
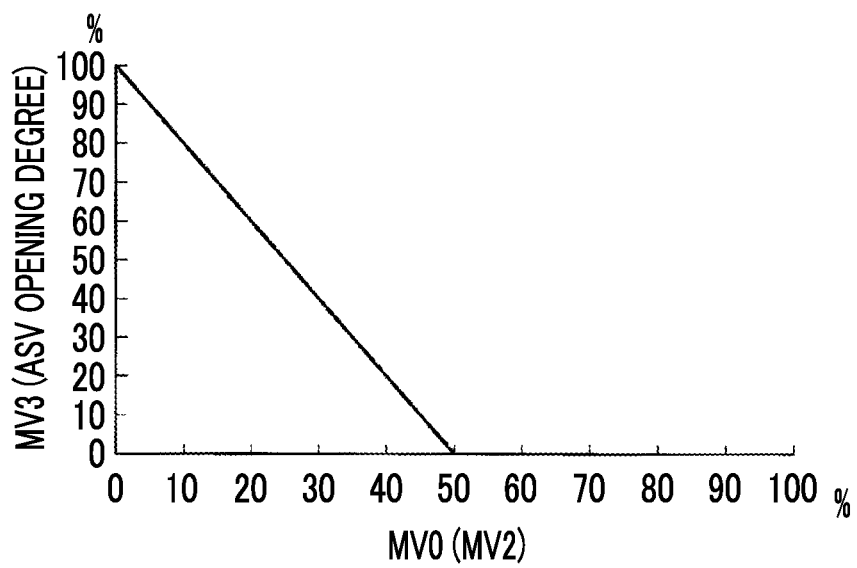
FIG. 4 is a third diagram explaining the function of the main pressure control unit according to the first embodiment.

FIGS. 2, 3, and 4 respectively are a first diagram, a second diagram, and a third diagram explaining the function of the main pressure control unit according to the first embodiment.

Hereinafter, in addition to FIG. 1, the function of the main pressure control unit 101a is described with reference to FIGS. 2 to 4.

As shown in FIG. 1, the main pressure control unit 101a includes function generators 19, 27, 29, an adder 21, a pressure controller 23 (PC), a flow controller 35 (FC), and a high-level selection unit 31.

When the gas turbine 15 is operated, the load command 17 sends a demand signal DEM to the function generator 19. The demand signal DEM is applied as a load rate in a case where the maximum load of the gas turbine 15 is set to 100%.

The demand signal DEM output by the load command 17 on the basis of a function exemplified in FIG. 2 is input to the function generator 19, and the function generator 19 performs a conversion process in which the demand signal DEM is converted into a feedforward control value MV0 and outputs a control signal indicating the feedforward control value MV0. The feedforward control value MV0 indicated by the control signal output by the function generator 19 is input to the adder 21.

A signal indicating an actual pressure (actual discharge pressure PV1), which is the pressure of the fuel gas discharged to the gas turbine 15 by the compressor 1 and is detected by a pressure meter 25, is input to the pressure controller 23, and the pressure controller 23 outputs a control signal indicating a first feedback control value MV1 for allowing the actual discharge pressure PV1 to coincide with a predefined set value (set pressure SV1) of the discharge pressure. Specifically, the pressure controller 23 calculates the first feedback control value MV1 which is obtained by performing a Proportional Integral (PI) processing on deviation between the set pressure SV1 and the detected actual discharge pressure PV1, and outputs a control signal corresponding to the first feedback control value MV1 to the adder 21.

The adder 21 performs calculation which adds the feedforward control value MV0 and the first feedback control value MV1 so as to obtain an intermediate control value MV2, and outputs a signal corresponding to the intermediate control value MV2 to the function generator 27 and the function generator 29.

The function generator 27 outputs a valve control signal on the basis of a function exemplified in FIG. 3 to the IGV 5. For example, the function generator 27 maintains an IGV opening degree (opening degree in valve of IGV 5) to 20% (corresponding to the minimum opening degree) until the feedforward control value MV0 becomes 50%, forms a valve control signal by which the IGV opening degree is linearly increased from 20% to 100% (corresponding to the maximum opening degree) as the feedforward control value MV0 increases from 50%, and outputs this valve signal to the IGV 5.

The function generator 29 outputs a valve control signal on the basis of a function exemplified in FIG. 4 to the high-level selection unit 31. For example, the function generator 29 sets an anti-surge valve control value MV3 which linearly decreases the ASV opening degree (opening degree in the valve of the ASV 7) from 100% (corresponding to the maximum opening degree) to 0% (corresponding to the minimum opening degree) until the feedforward control value MV0 becomes 50% and maintains the ASV opening degree to 0% when the feedforward control value MV0 is 50% or more, and outputs a signal corresponding to the anti-surge valve control value MV3 to the high-level selection unit 31 via an adder 41 described below.

The flow controller 35 calculates a second feedback control value MV4 which is corresponding to deviation between a set value (set flow rate SV2) of a discharge flow rate which is the flow rate of the fuel gas supplied form the compressor 1 to the header tank 13 and is defined in advance, and a flow rate (actual discharge flow rate PV2) detected actually by a flow-meter 37, and outputs a signal corresponding to the second feedback control value MV4 to the high-level selection unit 31.

The high-level selection unit 31 compares the signal indicating the anti-surge valve control value MV3 output from the function generator 29 and the signal indicating the second feedback control value MV4 output by the flow controller 35 with each other, and outputs the signal which is greater between two signals to the ASV 7 as a valve control signal.

According to the above-described configuration, the main pressure control unit 101a controls the IGV 5 and the ASV 7 using the feedforward control value MV0 which is generated on the basis of the load (the load indicated by the demand signal DEM) of the gas turbine 15 and the conversion process performed by the function generator 19, and the first feedback control value MV1 which is generated on the basis of the deviation between the set value (set pressure SV1) of the discharge pressure of the compressor 1 and the measured value (actual discharge pressure PV1) of the discharge pressure of the compressor 1.

Since the specific effects according to the configuration of the main pressure control unit 101a are the same as those disclosed in PTL 1, detailed descriptions thereof are omitted. According to the above-described functional configuration of the main pressure control unit 101a, since the discharge pressure is controlled by combination of the feedforward control and the feedback control, a pressure control having high responsibility can be achieved. Accordingly, even in a case where a rapid load demand is made in the gas turbine 15, it is possible to control variation of the discharge pressure.

Figure 5:
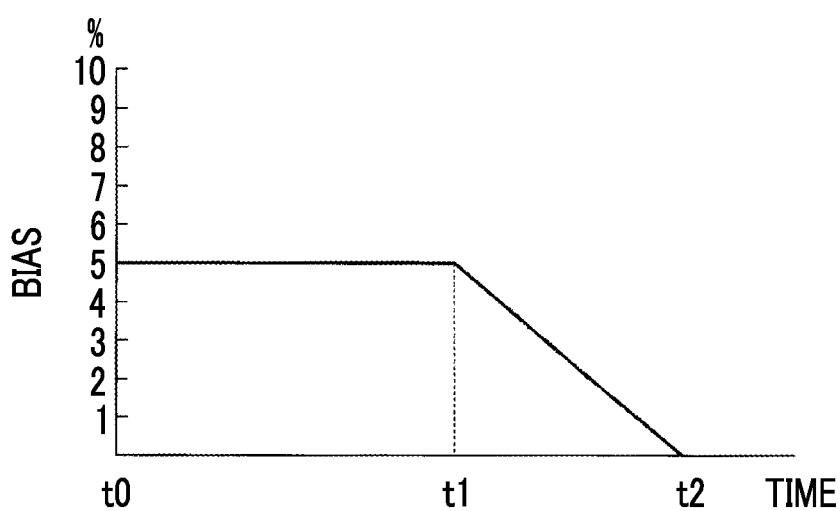
FIG. 5 is a first diagram explaining a function of an emergency pressure control unit according to the first embodiment.
Figure 6:
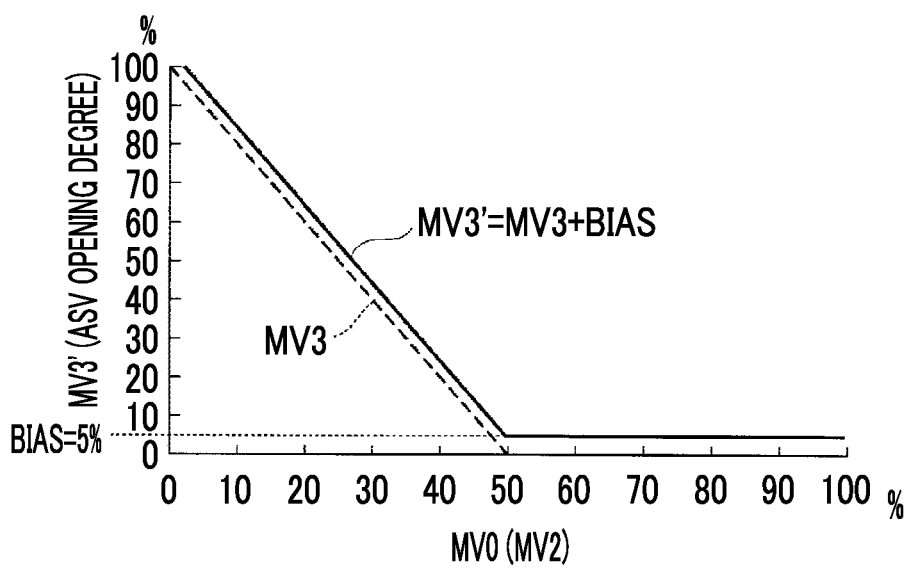
FIG. 6 is a second diagram explaining the function of the emergency pressure control unit according to the first embodiment.

FIGS. 5 and 6 are a first diagram and a second diagram respectively explaining the function of the emergency pressure control unit according to the first embodiment.

Hereinafter, in addition to FIG. 1, the function of the emergency pressure control unit 101b is described with reference to FIGS. 5 and 6.

As shown in FIG. 1, the emergency pressure control unit 101b includes a bias output unit 39 and the adder 41.

In a case where the bias output unit 39 receives a notification signal TRP indicating that the load variation per unit time in the gas turbine 15 is a predetermined variation width or more, and the bias output unit 39 directly outputs a predefined bias value BIAS (BIAS>0). For example, the notification signal TRP is a signal which notifies the rapid load variation which is generated when interruption of a load, tripping, or the like occurs in the gas turbine 15. In addition, during normal times (before the bias output unit 39 receives the notification signal TRP), the bias output unit 39 always sets the bias signal to zero (BIAS=0).

The bias signal output by the bias output unit 39 is output to the adder 41. Accordingly, a predetermined bias value BIAS (>0) is added to the anti-surge valve control value MV3 for determining the ASV opening degree. The adder 41 outputs a bias-added control value MV3' (MV3'=MV3+BIAS) obtained by the addition to the high-level selection unit 31.

According to the above-described configuration, the emergency pressure control unit 101b calculates the bias-added control value MV3' by adding the predefined bias value BIAS to the anti-surge valve control value MV3, and switches the anti-surge valve control value MV3 to the bias-added control value MV3' on the basis of occurrence of load variation of a predetermined value or more (that is, in the case where the emergency pressure control unit 101b receives the notification signal TRP) to control the ASV 7.

Specifically, as shown in FIG. 5, from a time t0 when the bias output unit 39 receives the notification signal TRP, the bias output unit 39 outputs a constant value (for example, 5%) which is predefined and is larger than zero. The bias output unit 39 maintain output of a constant value from the time t0 to a time t1 (t1>t0) after a certain time (for example, five seconds) elapses, and gradually decreases the output to zero at a constant rate from the time t1 to a time t2 (t2>t1).

In this way, after a predetermined time (time t2) which is defined in advance elapses from the time (time t0) when interruption of the load occurs, the bias output unit 39 returns the bias-added control value MV3' to the anti-surge valve control value MV3 to control the ASV 7.

Since the bias output unit 39 outputs the bias value BIAS shown in FIG. 5, from the moment that the rapid load variation such as interruption of the load occurs, the emergency pressure control unit 101b switches the anti-surge valve control value MV3 to the above-described bias-added control value MV3' to control the ASV 7. Here, as shown in FIG. 6, the bias-added control value MV3' is a control value which always is larger by the bias value BIAS (BIAS=5%) than the anti-surge valve control value MV3. That is, even in a case where the feedforward control value MV0 is from 50% to 100%, the anti-surge valve control value MV3 used to control the ASV 7 maintains the output of the bias value BIAS (for example, 5%) which is larger than zero for a certain time (for example, five seconds).

Next, effects of the fuel gas supply system according to the above-described first embodiment are described while comparing with a comparative example in which the emergency pressure control unit 101b is not provided.

In the case of the fuel gas supply system according to the comparative example, when rapid load variation such as interruption of a load or the like occurs, the IGV 5 is shifted in a closed direction on the basis of the feedforward control performed by prepared various functions (refer to FIGS. 2 to 4) and the ASV 7 is shifted in an opening direction, and the pressure (actual discharge pressure PV1) of the header tank 13 is constant. However, for example, according to characteristics of the generated load variation, the feedforward control value MV0 may be changed within a range of 50% or more. Here, according to the anti-surge valve control valve MV3 shown in FIG. 4, it is defined such that a closed state (a state of the opening 0%) of the ASV 7 is always maintained within a range in which the feedforward control value MV0 is 50% to 100%. Accordingly, for example, in a case where interruption of a load in which the feedforward control value MV0 decreases from 100% to 50% occurs, the pressure (actual discharge pressure PV1) of the header tank 13 is constantly maintained by controlling only the opening degree of the IGV 5, and the closed state (ASV opening degree is 0%) of the ASV 7 is maintained.

The ASV 7 is shifted in the opening direction and releases the fuel gas having an increased pressure on the inlet side so as to constantly maintain the actual discharge pressure PV1 while the IGV 5 is shafted in the closed direction and limits the inflow of the fuel gas into the compressor 1 so as to constantly maintain the actual discharge pressure PV1. In general, responsiveness of the IGV is lower than that of the control valve (ASV), and with respect to the interruption of the load in which the feedforward control value MV0 is changed within a range from 100% to 50%, since the pressure is regulated by only the control in the closed direction of the IGV 5, high response characteristics cannot be obtained.

Meanwhile, according to the fuel gas supply system 100 of the first embodiment, as shown in FIG. 6, the opening degree of the ASV 7 is determined on the basis of the bias-added control value MV3' which is obtained by adding the bias value BIAS to the anti-surge control value MV3 calculated according to occurrence of interruption of a load. Accordingly, even when the interruption of a load in which the feedforward control value MV0 is changed within a range from 100% to 50% occurs, the ASV 7 is open by the opening degree of the minimum bias value BIAS (for example, 5%).

Hereinbefore, according to the fuel gas supply system 100 of the first embodiment, in a case where rapid load variation occurs, the ASV 7 is always open even when the load variation has any characteristic. Accordingly, it is possible to increase response characteristics of the control so as to constantly maintain the discharge pressure of the compressor 1.

In addition, according to the fuel gas supply system 100 of the first embodiment, after a predetermined time which is defined in advance elapses from when interruption of a load or the like occurs, the bias output unit 39 returns the bias-added control value MV3' to the anti-surge valve control value MV3 to control the ASV 7. Accordingly, since the ASV 7 is immediately opened according to occurrence of interruption of a load, after a rapid increase of the discharge pressure is avoided with high response characteristics, the control is automatically returned to a normal control (a control on the basis of the feedforward control value MV0 and the first feedback control value MV1), and the normal state of the discharge pressure is immediately achieved. Therefore, it is possible to constantly maintain the discharge pressure with higher accuracy after rapid load variation such as interruption of load or the like occurs.

Moreover, according to the fuel gas supply system 100 of the first embodiment, the bias output unit 39 maintains the output of the bias value BIAS (BIAS>0) for a certain time from when the load variation occurs (time t0), and thereafter, gradually decreases the output to zero at a constant degree (rate) for a certain time (refer to FIG. 5). In this way, when the control is returned to the normal feedback control, the fuel gas supply system 100 can continuously shift the discharge pressure such that joints in the change of the discharge pressures do not occur.

In addition, the specific aspect of the fuel gas supply system 100 according to the first embodiment is not limited to the above-described aspect, and various design modifications or the like may be applied to the first embodiment within a scope which does not depart from the gist. For example, the fuel gas supply system 100 of the above-described first embodiment includes the single compressor 1. However, a fuel gas supply system according another embodiment is not limited to this aspect. For example, the fuel gas supply system 100 may include a plurality of compressors 1, and a plurality of IGVs 5 and a plurality of ASVs 7 may be installed so as to correspond to the plurality of compressors 1. Moreover, in this case, the emergency pressure control unit 101*b* may calculate a plurality of bias-added control values MV3' which are obtained by adding the bias value BIAS to a plurality of anti-surge valve control value MV3 corresponding to the plurality of compressors 1 during the operation, and may control the ASV 7 corresponding to each compressor 1 on the basis of each of the bias-added control values MV3'. Accordingly, in a case where interruption of a load or the like occurs, since all the ASVs 7 corresponding to all the compressors 1 during the operation are rapidly open, it is possible to further enhance the response characteristics in the control for uniformizing the discharge pressures of the compressors 1.

In addition, in the fuel gas supply system 100 according to the above-described first embodiment, for example, the bias value BIAS output by the bias output unit 39 when the rapid load variation occurs has a constant value such as 5%. However, the fuel gas supply system according another embodiment is not limited to this aspect. For example, in a case where a plurality of gas turbines 15 are installed, the bias output unit 39 may detect the number of the gas turbines 15 in which a load is rapidly changed, and may change the value of the bias value BIAS so as to be proportional to the number of the gas turbines 15. Accordingly, since the control is performed such that the opening degree of the ASV 7 increases as the degree of the load variation increases, it is possible to further enhance the response characteristics of the control when interruption of a load or the like occurs.

Second Embodiment

Hereinafter, a fuel gas supply system according to a second embodiment is described in detail with reference to FIG. 7.

Figure 7:
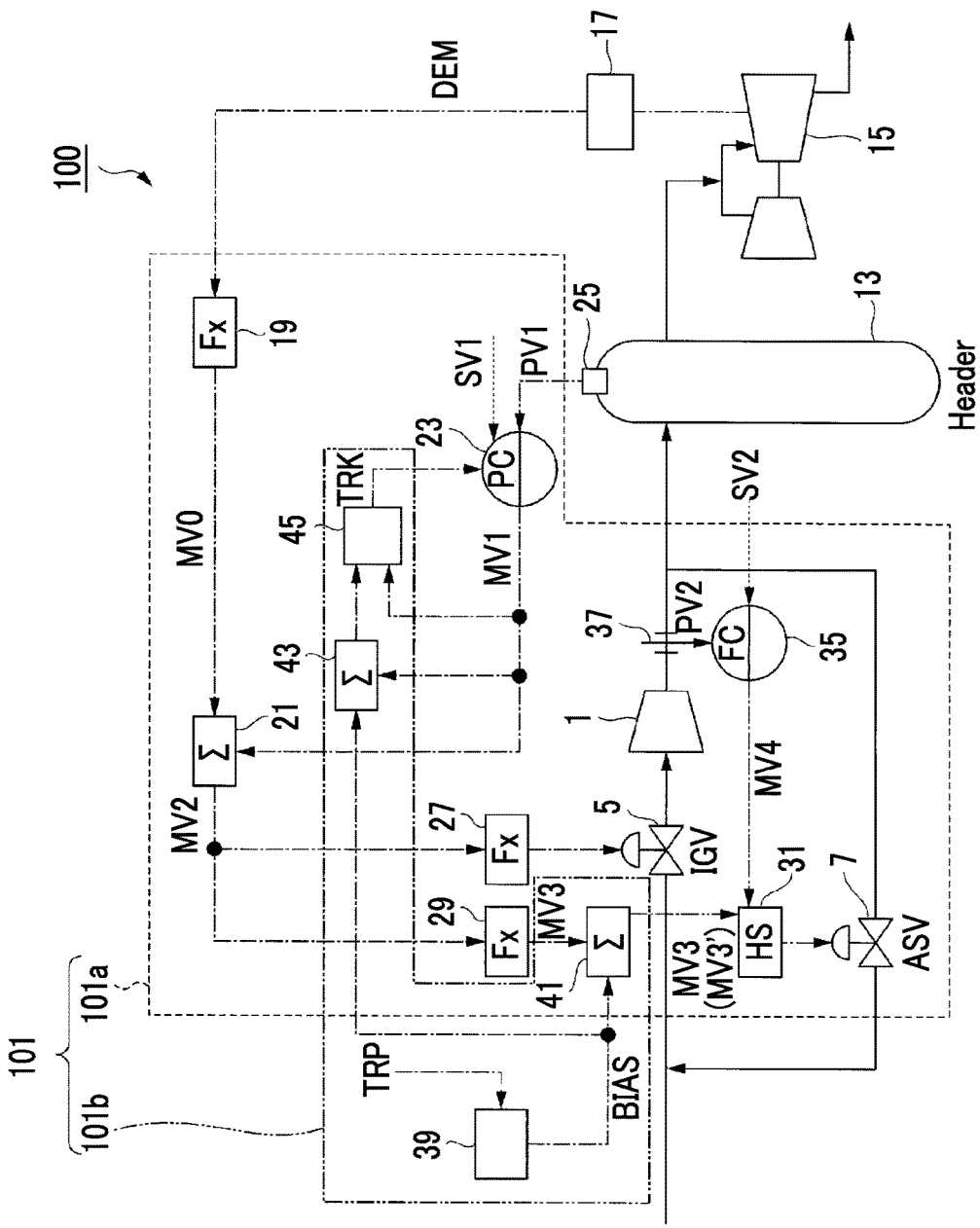
FIG. 7 is a diagram showing a functional configuration of a fuel gas supply system according to a second embodiment.

FIG. 7 is a diagram showing a functional configuration of the fuel gas supply system according to the second embodiment.

In the functional configurations of the fuel gas supply system 100 according to the second embodiment shown in FIG. 7, the same reference numerals are assigned to the same functional configurations as those of the first embodiment, and descriptions thereof are omitted.

Moreover, similarly to the first embodiment, in a case where the bias output unit 39 according to the second embodiment receives the notification signal TRP, the bias output unit 39 outputs a constant bias value BIAS (BIAS>0) only for a certain time t1 (for example, t1=5 seconds). However, the bias output unit 39 of the present embodiment is different from the first embodiment in that the bias output unit 39 immediately (stepwise) stops the output of the bias value BIAS after a certain time t1 elapses.

As shown in FIG. 7, the emergency pressure control unit 101b according to the second embodiment further includes an adder 43 and a switch element 45.

The bias value BIAS output by the bias output unit 39 and the first feedback control value MV1 output by the pressure controller 23 are input to the adder 43 so as to be added to each other.

The switch element 45 is operated when the switch element 45 receives the notification signal TRP notifying occurrence of the rapid load variation, captures the first feedback control value MV1, and returns the first feedback control value MV1 to the pressure controller 23 as a tracking value TRK. Accordingly, the main pressure control unit 101a stops the feedback control on the basis of the first feedback control value MV1, acquires the pressure (actual discharge pressure PV1) of the header tank 13 by the pressure meter 25, and continuously performs tracking on the first feedback control value MV1 corresponding to the actual discharge pressure PV1.

In addition, after a period when the bias output unit 39 outputs a constant bias value BIAS (>0) elapses, the switch element 45 ends the tracking of the first feedback control value MV1, and restarts the feedback control on the basis of the pressure controller 23. At this time, the switch element 45 transmits the calculation value calculated by the adder 43, that is, the total value of the first feedback control value MV1 and the bias value BIAS during the tracking to the pressure controller 23, and immediately after that, the switch element 45 restarts the feedback control. Accordingly, when the main pressure control unit 101a restarts the feedback control by the pressure controller 23, the main pressure control unit 101a restarts the feedback control from a step in which the opening degrees of the IGV 5 and the ASV 7 are regulated so as to be changed in the opening direction by the opening degree corresponding to the bias value BIAS.

In this way, after a certain time elapses from the time when the emergency pressure control unit 101b receives the input of the notification signal TRP, the emergency pressure control unit 101b returns the bias-added control value MV3' to the anti-surge valve control value MV3, and performs processing in which the bias value BIAS is added to the first feedback control value MV1. In addition, after a certain time elapses, the main pressure control unit 101a restarts the feedback controls of the IGV 5 and the ASV 7 on the basis of the feedforward control value MV0 and the first feedback control value MV1 to which the bias value BIAS is added.

Here, as described above, in the case of the second embodiment, when the certain time t1 elapses after the rapid load variation occurs and the bias output unit 39 restarts the feedback control, the bias output unit 39 sets the bias value BIAS to zero stepwise. However, in a case where any allowance is not performed on the first feedback control value MV1, it is assumed that the ASV 7 which is forcibly opened according to the bias value BIAS (BIAS>0) is rapidly closed at the timing when the bias value BIAS becomes zero and the actual discharge pressure PV1 increases stepwise. Accordingly, joints (variation such as overshoot or undershoot) in the changes of the discharge pressures occur at the timing when the main pressure control unit 101a is shifted to the feedback control, and time is required until complete stabilization is realized.

Therefore, immediately before the fuel gas supply system 100 according to the second embodiment restarts the feedback control, the emergency pressure control unit 101b delivers the total value (MV1+BIAS) of the bias value BIAS (>0) and the first feedback control value MV1 to the pressure controller 23. In addition, when the feedback control starts, the pressure controller 23 regulates the opening degrees of the IGV 5 and the ASV 7 on the basis of the delivered total value (MV1+BIAS).

In this way, when the feedback control restarts, the IGV 5 and the ASV 7 are controlled such that the opening degrees thereof increase by the value corresponding to the bias value BIAS (>0). Accordingly, even in a case where the bias value BIAS by which the ASV 7 is forcibly opened is shifted to zero, since the opening degree increases by the value corresponding to the bias value BIAS in the feedback control which restarts simultaneously with the shift, influences applied to the discharge pressures are canceled with each other, and as a result, it is possible to shift the discharge pressure without joints.

Hereinbefore, when the control is returned to the normal feedback control, the fuel gas supply system 100 can continuously shift the discharge pressure such that joints in the change of the discharge pressures do not occur. In addition, since the bias output unit 39 does not need to gradually decrease the bias value BIAS at a constant rate, it is possible to simplify the control of the bias output unit 39.

Third Embodiment

Hereinafter, a fuel gas supply system according to a third embodiment is described in detail with reference to FIG. 8.

Figure 8:
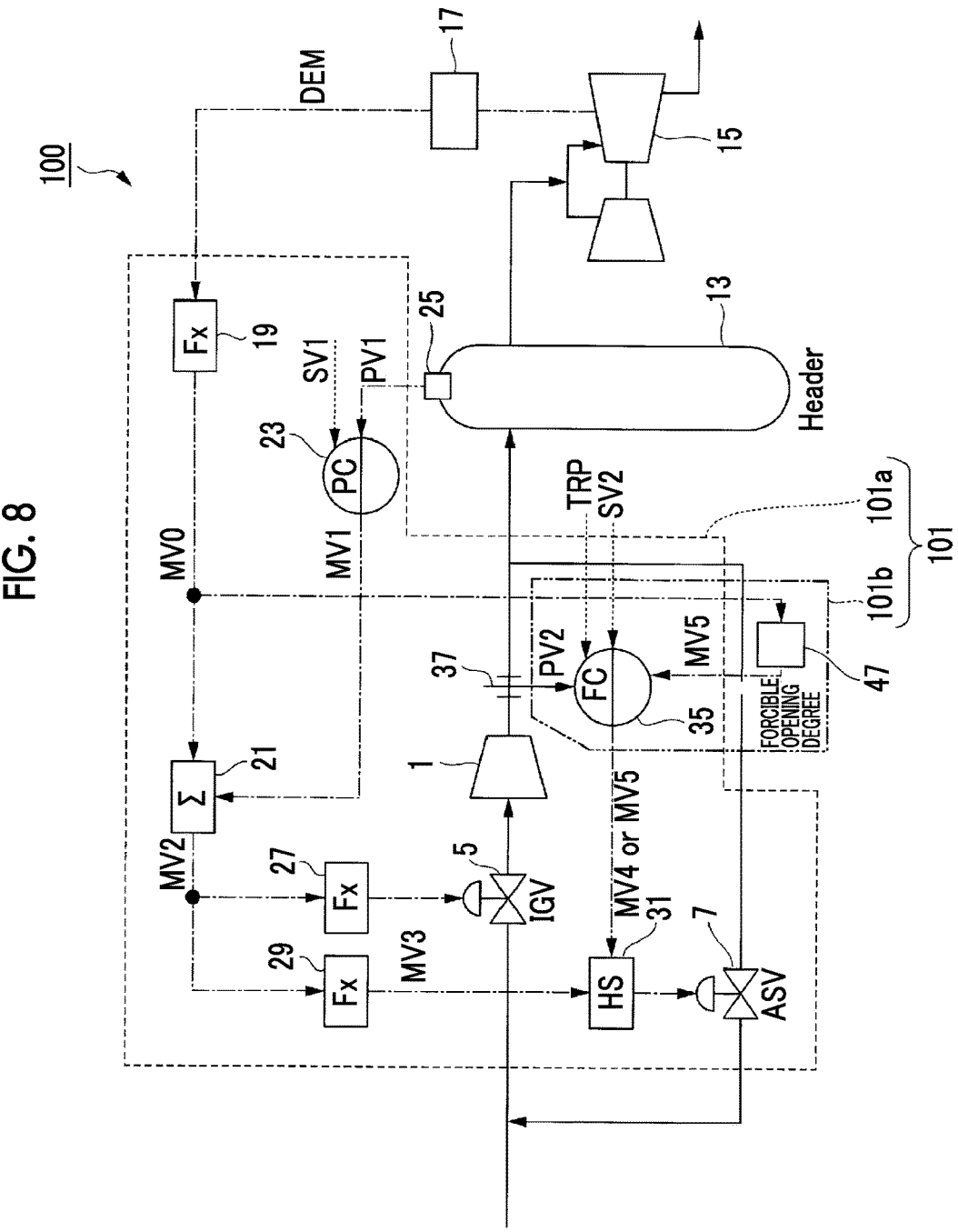
FIG. 8 is a diagram showing a functional configuration of a fuel gas supply system according to a third embodiment.

FIG. 8 is a diagram showing a functional configuration of the fuel gas supply system according to the third embodiment.

In the functional configurations of the fuel gas supply system 100 according to the third embodiment shown in FIG. 8, the same reference numerals are assigned to the same functional configurations as those of the first embodiment, and descriptions thereof are omitted.

As shown in FIG. 8, the emergency pressure control unit 101b of the fuel gas supply system 100 according to the third embodiment includes a forcible opening control unit 47.

The forcible opening control unit 47 outputs a predetermined forcible opening control value MV5 to the flow controller 35. The forcible opening control value MV5 is a control value which forcibly opens the ASV 7 by an opening degree (ASV opening degree 5%) of a predetermined value or more. By capturing the feedforward control value MV0 in the state where the ASV 7 is forcibly opened, the forcible opening control value MV5 according to the present embodiment is set to an appropriate opening degree corresponding to the feedforward control value MV0 (that is, a target value of the load during the load variation). Here, for example, the forcible opening control unit 47 may control the ASV 7 on the basis of the function (refer to FIG. 4) which is defined by the function generator 29. However, as described above, even when the feedforward control value MV0 has any value, the forcible opening control unit 47 always outputs a control value by which the ASV 7 is set to the minimum opening degree which is greater than zero.

Similarly to the first and second embodiments, in the normal state (the state where the load is stable), the flow controller 35 according to the present embodiment regulates the opening degree of the ASV 7 on the basis of the second feedback control value MV4 which is calculated on the basis of the deviation between the discharge flow rate (actual discharge flow rate PV2) of the compressor 1 measured by the flow-meter 37 and the set flow rate SV2. However, in a case where the flow controller 35 according to the present embodiment receive the input of the notification signal TRP notifying the rapid load variation occurring, the flow controller 35 stops the output of the second feedback control value MV4, and instead of this, the flow controller 35 outputs the forcible opening control value MV5, which is received from the forcible opening control unit 47, to the high-level selection unit 31. The high-level selection unit 31 selects the higher value of the forcible opening control value MV5 and the anti-surge valve control value MV3 to regulate the opening degree of the ASV 7. Accordingly, even if the anti-surge valve control value MV3 is the value of the closed state (opening degree 0%), in this case, the forcible opening control value MV5 having a value which is larger than the opening degree 0% is selected.

In addition, after the flow controller 35 outputs the forcible opening control value MV5 only for a predetermined time (for example, five seconds) which is defined in advance, and the flow controller 35 switches the output to the output of the second feedback control value MV4 again. At this time, the flow controller 35 may change the output from the forcible opening control value MV5 to the second feedback control value MV4 such that the values MV5 and MV4 gradually approach each other at a constant rate within a predetermined time.

Hereinbefore, according to the fuel gas supply system 100 of the third embodiment, in the case where the rapid load variation occurs, the emergency pressure control unit 101*b* controls the opening degree of the ASV 7 on the basis of the forcible opening control value MV5 which is output by the forcible opening control unit 47. Accordingly, since the ASV 7 is always open even when the load variation has any characteristic, it is possible to enhance response characteristics of a control by which the discharge pressure of the compressor 1 is constantly maintained.

In addition, according to the fuel gas supply system 100 of the third embodiment, since the emergency pressure control unit 101*b* directly opens the ASV 7 by the forcible opening control unit 47, it is possible to reliably and quickly open the ASV7, and it is possible to perform pressure regulation with higher response characteristics.

Moreover, in the third embodiment, the second feedback control value MV4 corresponds to the anti-surge valve control value by which the anti-surge valve is controlled, and the forcible opening control value MV5 corresponds to the bias-added control value in which the bias value BIAS larger than zero is added to the feedforward control value MV0.

In addition, the specific aspect of the fuel gas supply system 100 according to the third embodiment is not limited to the above-described aspect, and various design modifications or the like may be applied to the third embodiment within a scope which does not depart from the gist. For example, the forcible opening control unit 47 does not receive the input the feedforward control value MV0 but receives the input of the intermediate control value MV2, and may determine the opening degree of the ASV 7 on the basis of the intermediate control value MV2. In addition, the forcible opening control unit 47 may control the ASV 7 such that the opening degree of the ASV 7 is a fixed opening degree which is defined in advance and is zero or more.

Hereinbefore, according to the control device 101 of the above-described embodiments and modification examples, it is possible to more immediately stabilize variation in a pressure in a case where rapid load variation occurs in the load apparatus.

In addition, the above-described control device 101 includes a computer system inside the control device 101. In addition, processing processes of the above-described control device 101 are stored in a computer readable recording medium in a program format, and the processing is performed by reading and carrying-out the programs using a computer. Here, as the computer readable recording medium, there is a magnetic disk, a magneto-optical disk, a Compact Disc Read Only Memory (CD-ROM), a semiconductor memory, or the like. In addition, the computer program is transmitted to a computer via a communication line, and the computer which receives the transmission may carry-out the program.

Hereinbefore, some embodiments of the present invention are described. However, the embodiments are exemplified, and claims are not limited by the embodiments. Various aspects are applied to the embodiments, and various omission, replacements, and modifications are applied within a scope which does not depart from the gist of the present invention. The embodiments or modifications thereof are include in the scope or the gist of the present invention, and are included in the inventions described in claims and the equivalent scope thereof.

INDUSTRIAL APPLICABILITY

According to the above-described control device and control method, it is possible to more immediately stabilize variation in a pressure in a case where rapid load variation occurs in a load apparatus.

REFERENCE SIGNS LIST

100: fuel gas supply system
101: control device
101*a*: main pressure control unit
101*b*: emergency pressure control unit
1: compressor
5: inlet guide vane (inflow amount regulating means)
7: anti-surge valve
13: header tank
15: gas turbine (load apparatus)
17: load command
19: function generator
21: adder
23: pressure controller
25: pressure meter
27: function generator
29: function generator
31: high-level selection unit
35: flow controller
37: flow-meter
39: bias output unit
41: adder
43: adder
45: switch element
47: forcible opening control unit

The invention claimed is:

1. A control device configured to control a fuel gas supply system which includes a compressor which compresses fuel gas and supplies the compressed fuel gas to a load apparatus, inflow amount regulating means for regulating an amount of the fuel gas which flows into the compressor, and an anti-surge valve for returning the fuel gas discharged from the compressor to an inlet side of the compressor, wherein the control device comprises:

a main pressure control unit configured to control the inflow amount regulating means and the anti-surge valve on the basis of a feedforward control value which is generated on the basis of a load of the load apparatus and a predetermined conversion process, and a feedback control value which is generated on the basis of a deviation between a set value of a discharge pressure of the compressor and a measured value of the discharge pressure of the compressor; and an emergency pressure control unit configured to calculate a bias-added control value by adding a predefined bias value to an anti-surge valve control value which is calculated on the basis of at least one of the feedforward control value and the feedback control value and controls the anti-surge valve, and switches the anti-surge valve control value to the bias-added control value on the basis of occurrence of load variation of a predetermined value or more to control the anti-surge valve;

wherein the emergency pressure control unit is configured to set the bias-added control value to the predefined bias value when the feedforward control value is a value of a closed state of the anti-surge valve, and provide control such that the bias-added control value becomes smaller as the feedforward control value becomes larger when the feedforward control value is a value of an open state of the anti-surge valve.

2. The control device according to claim 1, wherein the emergency pressure control unit is configured to return the bias-added control value to the anti-surge valve control value after a predetermined time which is defined in advance elapses from when the load variation occurs to control the anti-surge valve.

3. The control device according to claim 2, wherein after the emergency pressure control unit is configured to maintain an output of the bias value from when the load variation occurs for a first certain time, the emergency pressure control unit decreases the output of the bias value to zero at a constant rate for a second certain time.

4. The control device according to claim 2, wherein the emergency pressure control unit is configured to calculate a plurality of bias-added control values by adding the bias value to each of a plurality of anti-surge valve control values corresponding to a plurality of compressors during operation, and control a respective anti-surge valve of a plurality of anti-surge valves corresponding to each of the plurality of compressors on the basis of each of the bias-added control values.

5. The control device according to claim 2, wherein the emergency pressure control unit is configured to return the bias-added control value to the anti-surge valve control value and simultaneously add the bias value to the feedback control value, and wherein the main pressure control unit is configured to control the inflow amount regulating means and the anti-surge valve on the basis of the feedforward control value and the feedback control value to which the bias value is added.

6. The control device according to claim 1, wherein after the emergency pressure control unit is configured to maintain an output of the bias value from when the load variation occurs for a first certain time, the emergency pressure control unit decreases the output of the bias value to zero at a constant rate for a second certain time.

7. The control device according to claim 6, wherein the emergency pressure control unit is configured to calculate a plurality of bias-added control values by adding the bias value to each of a plurality of anti-surge valve control values corresponding to a plurality of compressors during operation, and control a respective anti-surge valve of a plurality of anti-surge valves corresponding to each of the plurality of compressors on the basis of each of the bias-added control values.

8. The control device according to claim 6, wherein the emergency pressure control unit is configured to return the bias-added control value to the anti-surge valve control value and simultaneously add the bias value to the feedback control value, and wherein the main pressure control unit is configured to control the inflow amount regulating means and the anti-surge valve on the basis of the feedforward control value and the feedback control value to which the bias value is added.

9. The control device according to claim 1, wherein the emergency pressure control unit is configured to calculate a plurality of bias-added control values by adding the bias value to each of a plurality of anti-surge valve control values corresponding to a plurality of compressors during operation, and control a respective anti-surge valve of a plurality of anti-surge valves corresponding to each of the plurality of compressors on the basis of each of the bias-added control values.

10. The control device according to claim 9, wherein the emergency pressure control unit is configured to return at least one of the plurality of the bias-added control value to the anti-surge valve control value and simultaneously add the bias value to the feedback control value, and wherein the main pressure control unit is configured to control the inflow amount regulating means and the anti-surge valve on the basis of the feedforward control value and the feedback control value to which the bias value is added.

11. The control device according to claim 1, wherein the emergency pressure control unit is configured to return the bias-added control value to the anti-surge valve control value and simultaneously add the bias value to the feedback control value, and wherein the main pressure control unit is configured to control the inflow amount regulating means and the anti-surge valve on the basis of the feedforward control value and the feedback control value to which the bias value is added.

12. A control method which controls a fuel gas supply system which includes a compressor which compresses fuel gas and supplies the compressed fuel gas to a load apparatus, inflow amount regulating means for regulating an amount of the fuel gas which flows into the compressor, and an anti-surge valve for returning the fuel gas discharged from the compressor to an inlet side of the compressor, wherein the control method comprises:

a first step of controlling the inflow amount regulating means and the anti-surge valve on the basis of a feedforward control value which is generated on the basis of a load of the load apparatus and a predetermined conversion process, and a feedback control value which is generated on the basis of a deviation between a set value of a discharge pressure of the compressor and a measured value of the discharge pressure of the compressor; and a second step of calculating a bias-added control value by adding a predefined bias value to an anti-surge valve control value which is calculated on the basis of at least one of the feedforward control value and the feedback control value and controls the anti-surge valve, and switching the anti-surge valve control value to the bias-added control value on the basis of occurrence of load variation of a predetermined value or more to control the anti-surge valve, wherein the second step includes a step of setting the bias-added control value to the predefined bias value when the feedforward control value is a value of a closed state of the anti-surge valve, and controlling such that the bias-added control value becomes smaller as the feedforward control value becomes larger when the feedforward control value is a value of an open state of the anti-surge valve.

\* \* \* \* \*